(12) United States Patent
Zimmel et al.

(10) Patent No.: US 10,663,675 B2
(45) Date of Patent: May 26, 2020

(54) TUNED FIBER OPTIC CONNECTORS

(71) Applicants: CommScope Technologies LLC, Hickory, NC (US); CommScope Connectivity Belgium BVBA, Kessel-Lo (BE)

(72) Inventors: Steven C. Zimmel, Minneapolis, MN (US); Michael James Ott, Hudson, WI (US); Peter Viviane Leopold Bos, Scherpenheuvel (BE); Christopher Stroth, Lakeville, MN (US)

(73) Assignees: CommScope Technologies LLC, Hickory, NC (US); Commscope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 16/107,278

(22) Filed: Aug. 21, 2018

(65) Prior Publication Data
US 2019/0086616 A1 Mar. 21, 2019

Related U.S. Application Data

(63) Continuation of application No. 14/735,867, filed on Jun. 10, 2015, now Pat. No. 10,168,489, which is a continuation of application No. 14/025,296, filed on Sep. 12, 2013, now Pat. No. 9,081,154.

(60) Provisional application No. 61/700,172, filed on Sep. 12, 2012.

(51) Int. Cl.
*G02B 6/38* (2006.01)

(52) U.S. Cl.
CPC ......... *G02B 6/3871* (2013.01); *G02B 6/3843* (2013.01); *G02B 6/3851* (2013.01); *Y10T 29/49826* (2015.01)

(58) Field of Classification Search
CPC .................................................. G02B 6/3871
See application file for complete search history.

(56) References Cited

U.S. PATENT DOCUMENTS

| | | | |
|---|---|---|---|
| 4,679,895 A | 7/1987 | Huber et al. | |
| 4,690,494 A | 9/1987 | Hirose et al. | |
| 4,726,647 A | 2/1988 | Kakii et al. | |
| 4,753,510 A | 6/1988 | Sezerman | |
| 4,762,389 A | 8/1988 | Kaihara | |
| 4,792,205 A | 12/1988 | Yin et al. | |
| 4,889,406 A * | 12/1989 | Sezerman ................ | G02B 6/32 385/35 |
| 5,016,970 A | 5/1991 | Nagase et al. | |
| 5,134,677 A | 7/1992 | Leung et al. | |
| 5,142,598 A | 8/1992 | Tabone et al. | |
| 5,146,525 A | 9/1992 | Tabone et al. | |
| 5,181,267 A | 1/1993 | Gerace et al. | |
| 5,212,752 A * | 5/1993 | Stephenson .......... | G02B 6/3831 385/139 |

(Continued)

FOREIGN PATENT DOCUMENTS

| | | |
|---|---|---|
| EP | 1072914 A2 | 1/2001 |
| EP | 1072915 A2 | 1/2001 |

*Primary Examiner* — Peter Radkowski
(74) *Attorney, Agent, or Firm* — Merchant & Gould P.C.

(57) ABSTRACT

A method of tuning a fiber optic connector includes: assembling the fiber optic connector to a partially assembled state; tuning the fiber optic connector in the partially assembled state; assembling the fiber optic connector to an assembled state; and tuning the fiber optic connector in the assembled state.

4 Claims, 15 Drawing Sheets

(56) References Cited

U.S. PATENT DOCUMENTS

| | | | |
|---|---|---|---|
| 5,212,753 A | 5/1993 | Maranto et al. | |
| 5,214,732 A | 5/1993 | Beard et al. | |
| 5,216,733 A | 6/1993 | Nagase et al. | |
| 5,222,169 A | 6/1993 | Chang et al. | |
| 5,224,186 A | 6/1993 | Kishimoto et al. | |
| 5,253,315 A | 10/1993 | Fentress | |
| 5,287,425 A | 2/1994 | Chang | |
| 5,317,663 A | 5/1994 | Beard et al. | |
| 5,321,784 A | 6/1994 | Cubukciyan et al. | |
| 5,428,703 A | 6/1995 | Lee | |
| 5,436,995 A | 7/1995 | Yoshizawa et al. | |
| 5,625,731 A | 4/1997 | Turgeon et al. | |
| 5,633,970 A | 5/1997 | Olson et al. | |
| 5,671,310 A | 9/1997 | Lin et al. | |
| 5,682,451 A * | 10/1997 | Lee | G02B 6/3812 385/56 |
| 5,717,802 A | 2/1998 | Briggs et al. | |
| 5,732,175 A | 3/1998 | Fan | |
| 5,809,192 A * | 9/1998 | Manning | G02B 6/3843 385/76 |
| 5,852,694 A | 12/1998 | Kimura et al. | |
| 5,946,436 A | 8/1999 | Takashi | |
| 6,142,676 A | 11/2000 | Lu et al. | |
| 6,151,432 A * | 11/2000 | Nakajima | G02B 6/3831 385/55 |
| 6,155,146 A * | 12/2000 | Andrews | B25B 13/48 81/176.15 |
| RE37,079 E * | 3/2001 | Stephenson | G02B 6/3831 385/139 |
| RE37,080 E * | 3/2001 | Stephenson | G02B 6/3831 385/139 |
| 6,224,270 B1 * | 5/2001 | Nakajima | G02B 6/3831 385/55 |
| 6,238,101 B1 * | 5/2001 | Chen | G02B 6/3843 385/58 |
| 6,287,018 B1 | 9/2001 | Andrews et al. | |
| 6,419,402 B1 | 7/2002 | Zimmel | |
| 6,428,215 B1 * | 8/2002 | Nault | G02B 6/3843 385/78 |
| 6,629,782 B2 * | 10/2003 | McPhee | G02B 6/3843 385/76 |
| 6,695,489 B2 * | 2/2004 | Nault | G02B 6/3843 385/78 |
| 9,081,154 B2 * | 7/2015 | Zimmel | G02B 6/3871 |
| 2002/0081077 A1 * | 6/2002 | Nault | G02B 6/3843 385/78 |
| 2002/0126961 A1 * | 9/2002 | Hirabayashi | G02B 6/36 385/78 |
| 2003/0031447 A1 * | 2/2003 | Nault | G02B 6/3843 385/131 |
| 2003/0147598 A1 * | 8/2003 | McPhee | G02B 6/3843 385/78 |
| 2004/0151437 A1 | 8/2004 | Marrs et al. | |
| 2011/0229085 A1 * | 9/2011 | Bradley | G02B 6/3885 385/78 |
| 2014/0068913 A1 * | 3/2014 | Zimmel | G02B 6/3871 29/428 |

\* cited by examiner

TUNED FIBER OPTIC CONNECTORS

BACKGROUND

Fiber optic cables are used in the telecommunication industry to transmit light signals in high-speed data and communication systems. A standard fiber optic cable includes a fiber with an inner light transmitting optical core. Surrounding the fiber is an outer protective casing.

A fiber terminates at a fiber optic connector. Connectors are frequently used to non-permanently connect and disconnect optical elements in a fiber optic transmission system. There are many different fiber optic connector types. Some of the more common connectors are FC and SC connectors. Other types of connectors include ST and D4-type connectors.

A typical SC fiber optic connector includes a housing having a front end positioned opposite from a rear end. The front end of the SC connector housing is commonly configured to be inserted within an adapter. An example adapter is shown in U.S. Pat. No. 5,317,663, assigned to ADC Telecommunications, Inc. The SC connector typically further includes a ferrule that is positioned within the front and rear ends of the housing, and adjacent the front end. The ferrule is axially moveable relative to the housing, and is spring biased toward the front of the connector. The fiber optic cable has an end that is stripped. The stripped end includes a bare fiber that extends into the connector and through the ferrule.

A connector, such as the connector described above, is mated to another connector within an adapter like the adapter of U.S. Pat. No. 5,317,663. A first connector is received within the front portion of the adapter, and a second fiber is received within the rear portion of the adapter. When two connectors are fully received within an adapter, the ferrules (and hence the fibers internal to the ferrule) contact or are in close proximity to each other to provide for signal transmission between the fibers. Another connector and mating adapter is shown in U.S. Pat. No. 6,142,676, assigned to ADC Telecommunications, Inc.

Signal losses within a system often occur within the connection between two optical fiber cores. Due to manufacturing tolerances of the ferrule outer diameter to inner diameter concentricity, ferrule inner diameter hole size and fiber outer diameter, and fiber core to fiber outer diameter concentricity, when the fiber is inserted into the ferrule the core of a fiber may not and typically does not end up perfectly centered relative to the ferrule outer diameter. If one or both of the fibers are off center, when they are connected within an adapter, the fibers will not be aligned and thus there will be a signal loss when the signal is transmitted between the two fibers. It is therefore desirable to tune a connector to minimize this signal loss. Tuning can be accomplished by measuring signal characteristics through the connector and/or examining physical properties of the connector, and then determining the optimal position of the ferrule and fiber in the connector.

SUMMARY

In one aspect, a method of tuning a fiber optic connector includes: assembling the fiber optic connector to a partially assembled state; tuning the fiber optic connector in the partially assembled state; assembling the fiber optic connector to an assembled state; and tuning the fiber optic connector in the assembled state.

DETAILED DESCRIPTION

The present disclosure is directed towards systems and method for tuning fiber optic connectors. Although not so limited, an appreciation of the various aspects of the present disclosure will be gained through a discussion of the examples provided below.

Figure 1:
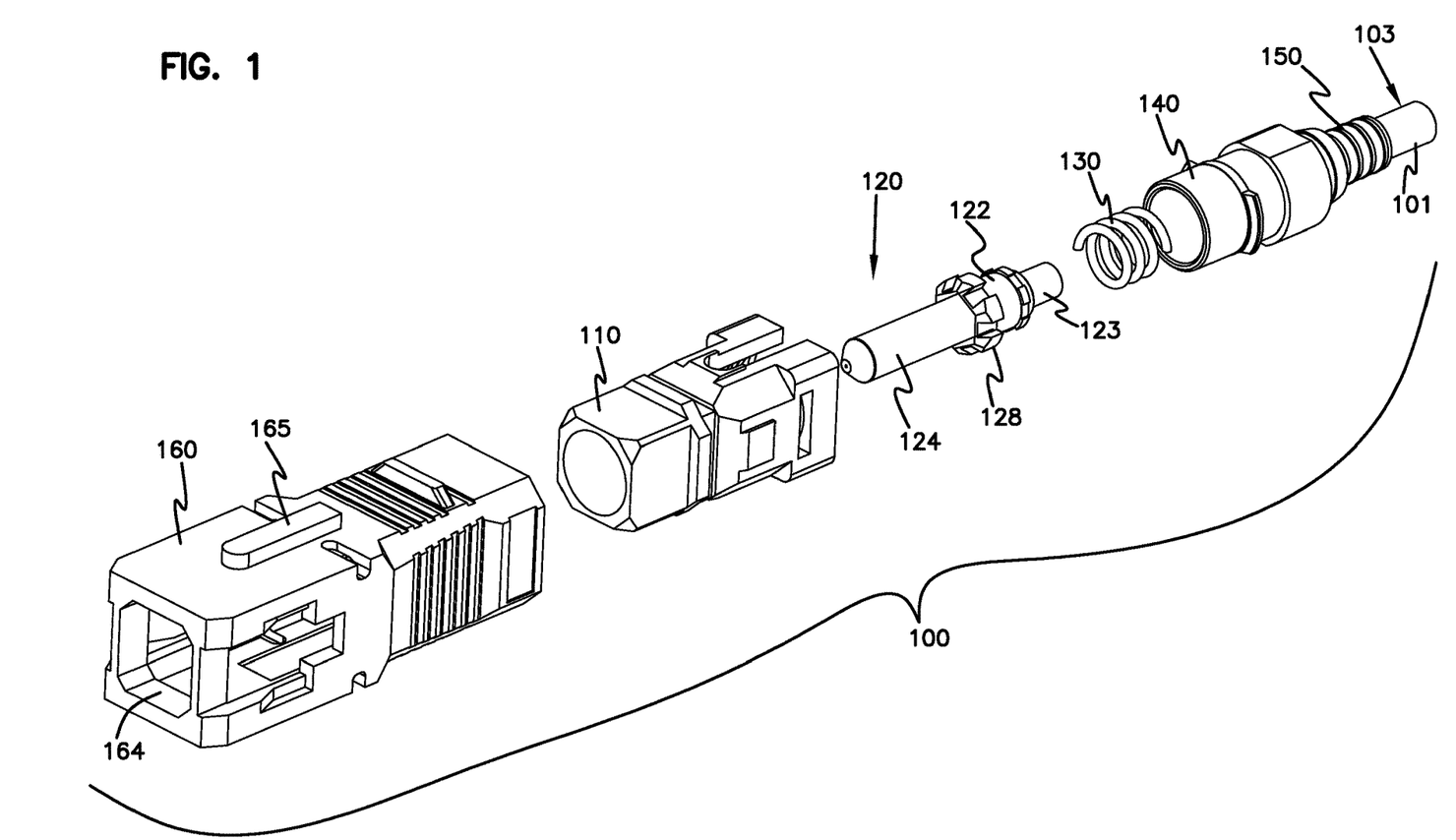
FIG. 1 shows an exploded view of an example fiber optic connector.

FIG. 1 is an exploded view of an example connector 100. The connector 100 includes a front housing 110, a rear housing 140, and a boot 150. Also included is a hub/ferrule assembly 120 with a hub 122 and a ferrule 124. The hub 122 includes an anti-rotation portion 128 and an elongated cylindrical rear portion 123. The hub 122 is connected to the ferrule 124, such as with adhesive or with an interference fit. A spring 130 is also provided. A fiber optic cable 101 is shown including a fiber and a jacket 103. The connector also includes a key member 160.

In examples described below, the connector 100 can be tuned using a plurality of methods. For example, the connector 100 can be tuned by rotating the hub/ferrule assembly 120 to a desired orientation during and/or after assembly. In another example, the key member 160 can be connected to the connector 100 in a desired orientation to tune the connector 100 after the connector 100 is assembled. Additional details regarding these tuning processes are provided below.

Referring to FIGS. 2-14, the connector 100 is tuned using a first process. In this first process, the orientation of the hub/ferrule assembly 120 is manipulated. In the example shown, the first process is done while the connector 100 is being assembled. However, as described further below, in alternative embodiments, the first process can also be performed after the connector 100 is assembled.

Figure 2:
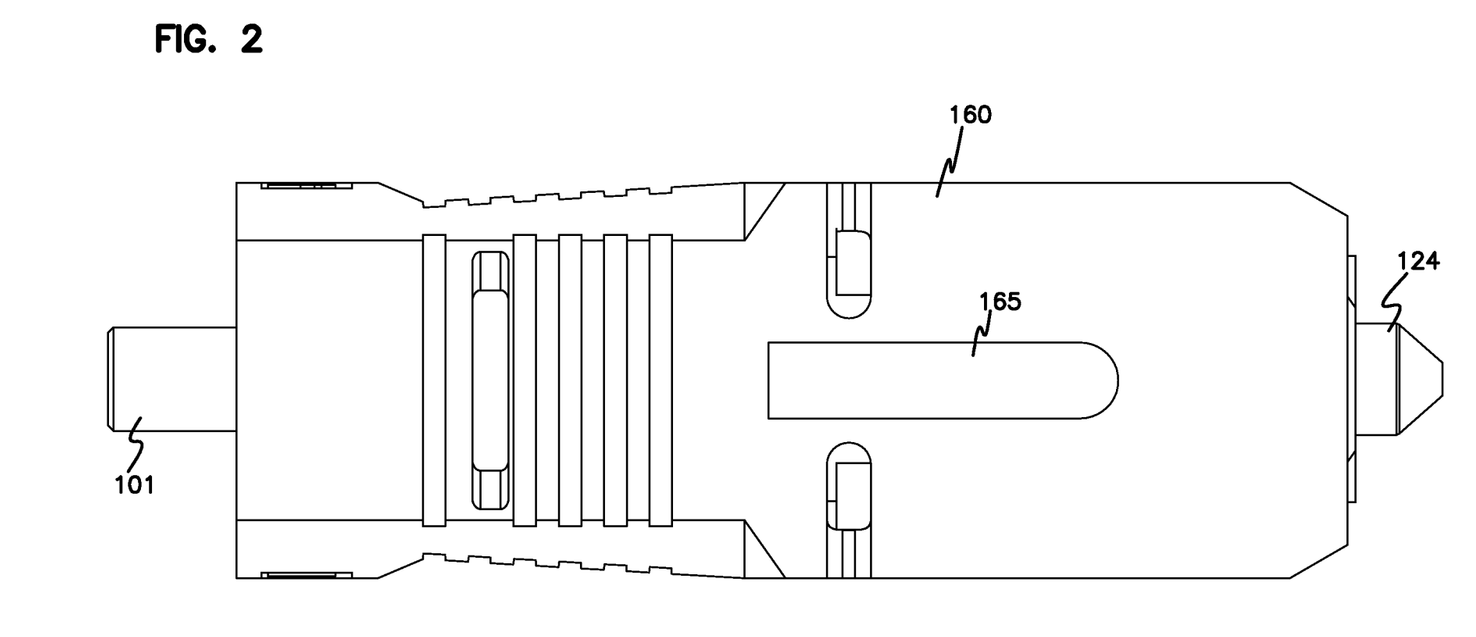
FIG. 2 is a side view of the connector of FIG. 1 in a fully assembled state.
Figure 3:
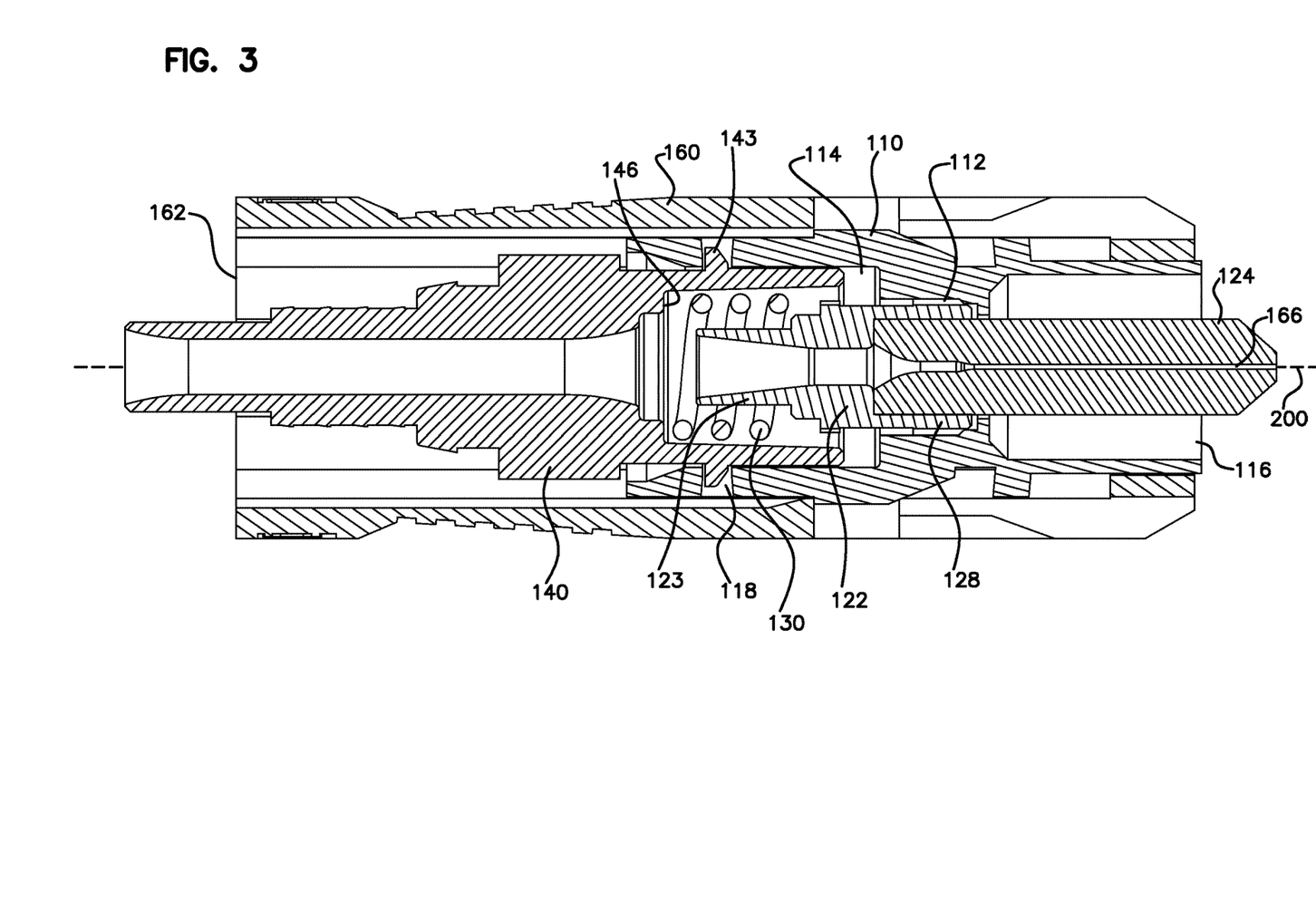
FIG. 3 is a cross-sectional view of the connector shown in FIG. 2.

In FIGS. 2 and 3, the connector 100 is shown in a fully assembled state. The front housing 110 of the connector 100 extends along a longitudinal axis 200 and defines an anti-rotation seat 112 and a cavity 114. The ferrule 124 extends through a front bore 116 of the front housing 110 and includes a passage 166. The anti-rotation portion 128 of the hub 122 is slidingly engaged along the longitudinal axis 200 in the anti-rotation seat 112.

In the example embodiment, the anti-rotation portion 128 is shaped in an octagonal configuration (see FIGS. 10-12) and the anti-rotation seat 112 defines a seat of a complementary geometry. At least two notches 180, 181 form the anti-rotation seat 112 and engage the anti-rotation portion 128 (see FIG. 10). The anti-rotation portion 128 and the anti-rotation seat 112 allow for sliding along the longitudinal axis 200, but prevent relative rotation. Other mating shapes and configurations are also possible. The elongated cylindrical rear portion 123 of the hub 122 extends into the cavity 114 of the front housing 110. The hub 122 includes a passage 119 extending along the longitudinal axis 200.

The spring 130 surrounds the elongated cylindrical rear portion 123 of the hub 122. The spring 130 is captured between the anti-rotation portion 128 and a surface 146 of the rear housing 140. The spring 130 functions to bias the anti-rotation portion 128 of the hub 122 into the anti-rotation seat 112 of the front housing 110. Because the ferrule 124 is connected to the hub 122, the spring 130 also functions to bias the ferrule 124 in a forward direction through the front bore 116.

FIGS. 2 and 3 show the final assembled positions of the front and rear housings 110 and 140. In the fully engaged position as shown, tabs 143 on the rear housing 140 engage openings 118 in the front housing 110.

An interference fit also is present when the front and rear housings 110 and 140 are partially inserted to allow for tuning and assembly of the connector 100, as described below.

Figure 4:
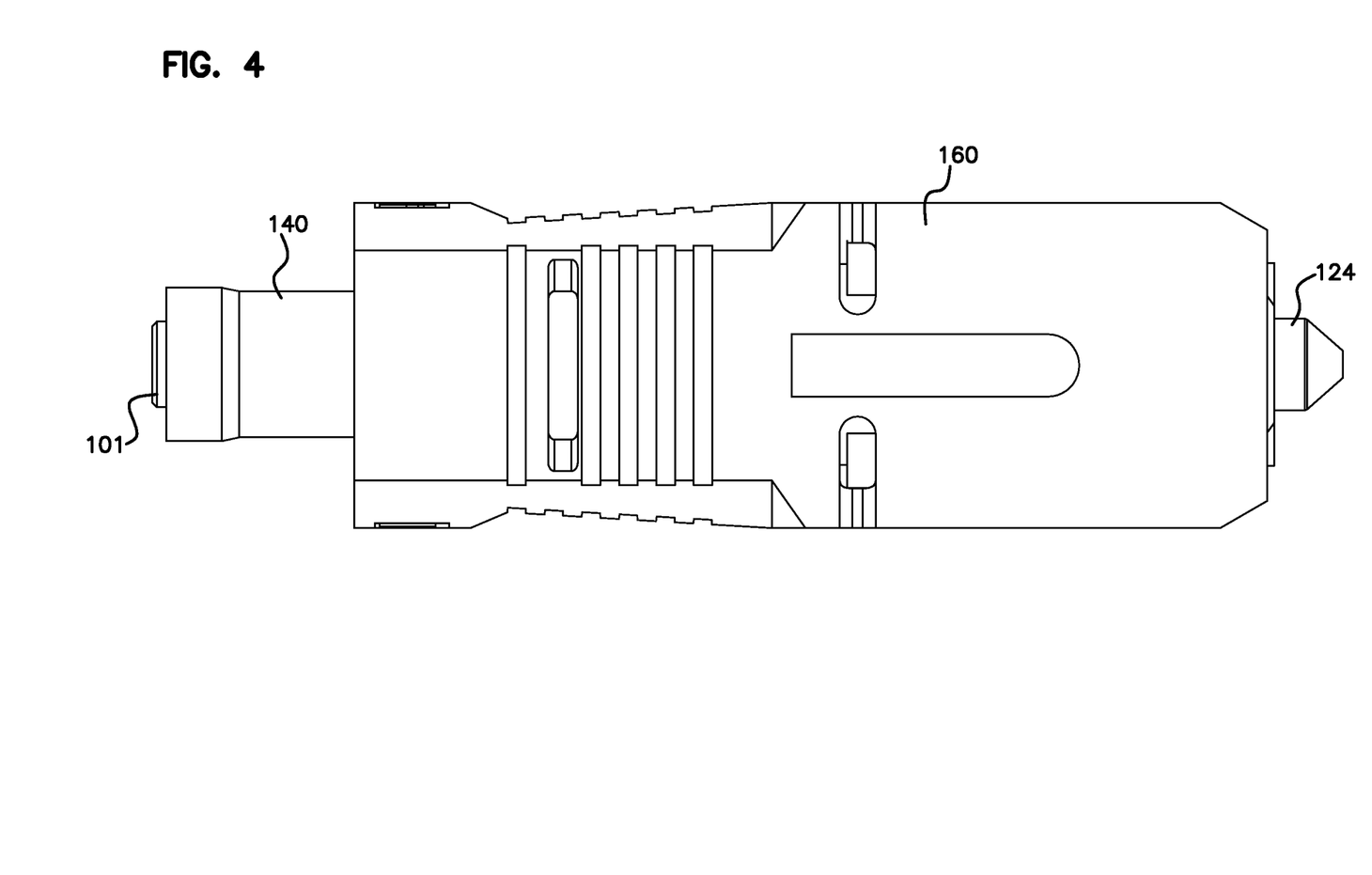
FIG. 4 is a side view of the connector of FIG. 1 in a partially assembled state.
Figure 5:
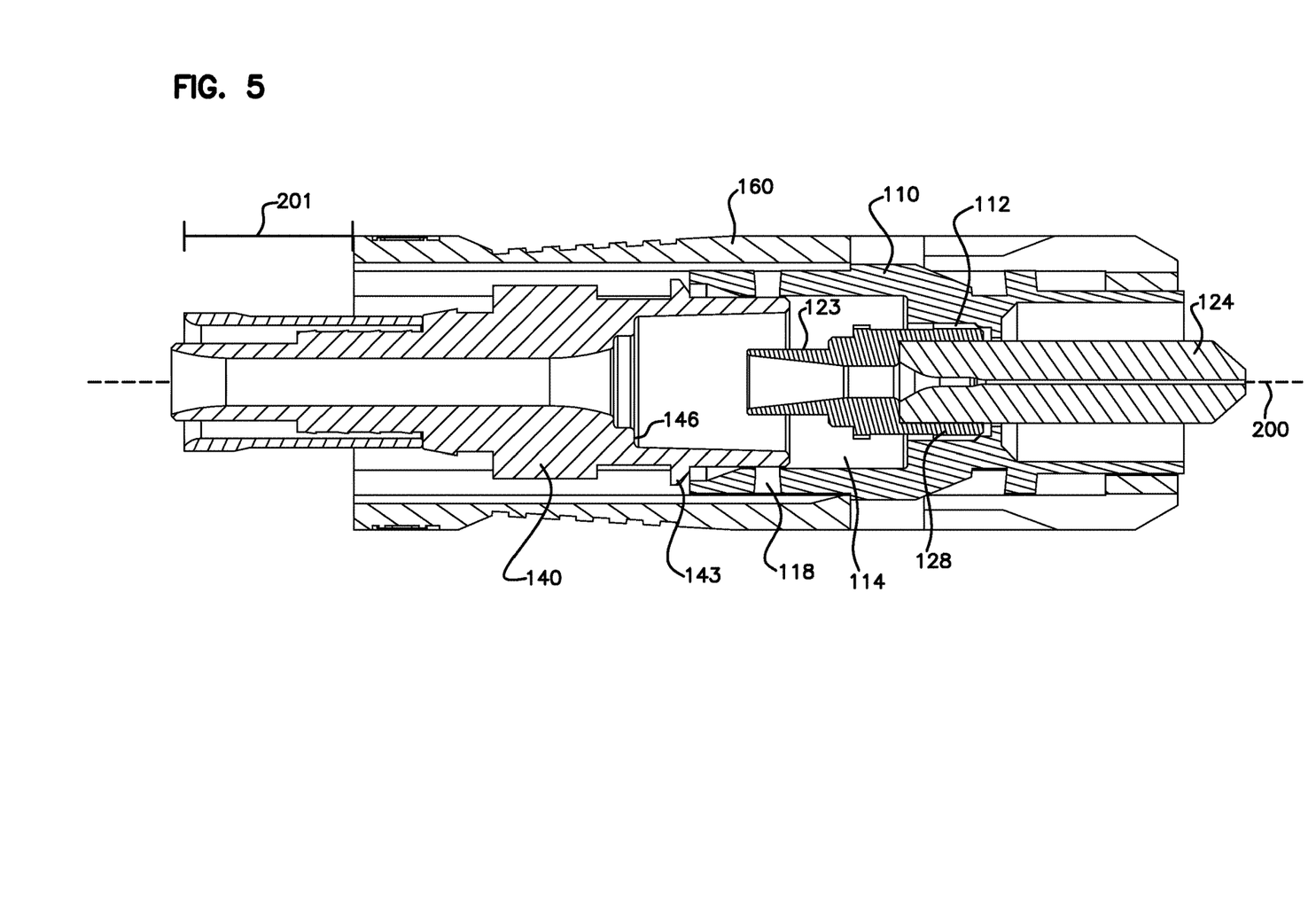
FIG. 5 is a cross-sectional view of the connector shown in FIG. 4.

In FIGS. 4 and 5, the hub 122 and ferrule 124 are inserted into the front housing so that the anti-rotation portion 128 of the hub 122 sits in the anti-rotation seat 112 of the front housing 110. Although the spring 130 has been removed for clarity, it should be understood that the spring 130 surrounds the elongated cylindrical rear portion 123 of the hub 122.

The rear housing 140 is then partially slid into the front housing 110 so that a portion 201 of the rear housing 140 at least partially remains outside of the front housing 110 and the tabs 143 of the rear housing 140 remain spaced apart from the openings 118. In this configuration, the spring 130 is captured between the anti-rotation portion 128 of the hub 122 and the surface 146 of the rear housing 140, and the spring biases the anti-rotation portion 128 of the hub 122 into the anti-rotation seat of the front housing 110, thereby preventing rotation of the hub 122 and the attached ferrule 124. A sufficient interference fit exists between the front and rear housings 110 and 140 so that the two parts are held together containing the spring 130, the hub 122, and the ferrule 124. The front and rear housings 110 and 140 are pressed together in any convenient manner, such as with a press or clamping tool.

Figure 6:
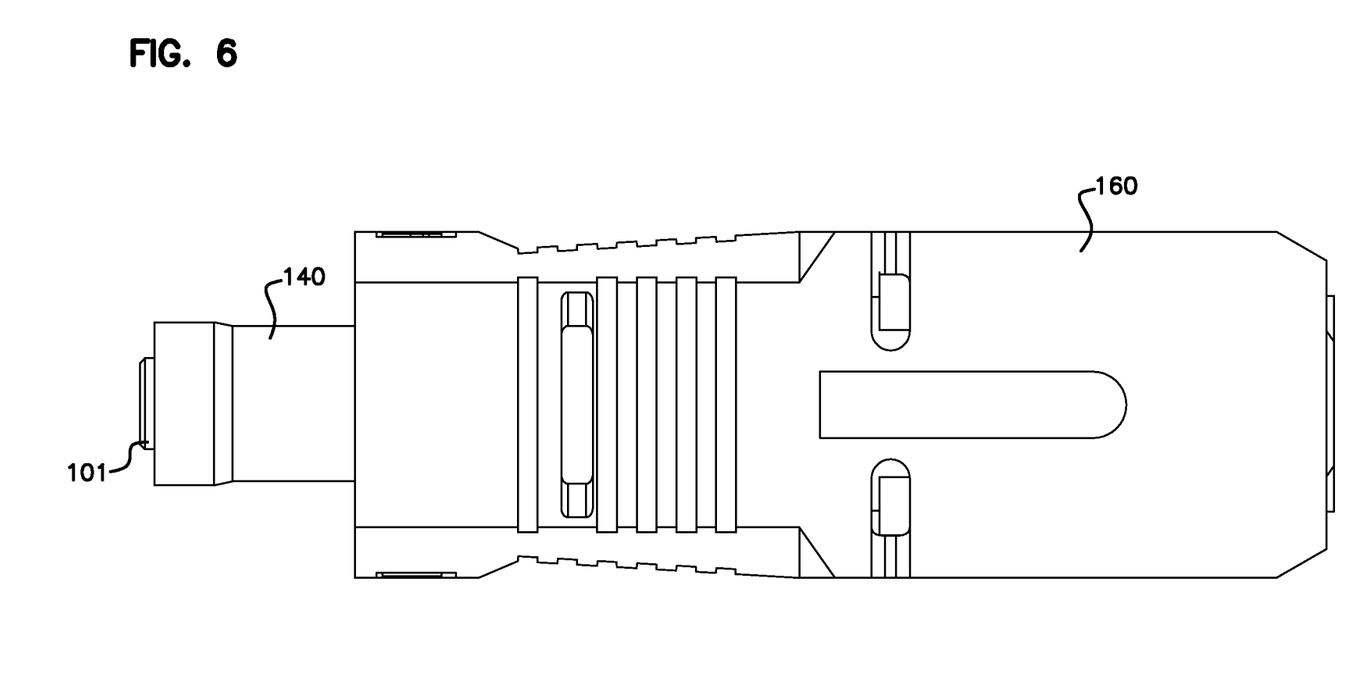
FIG. 6 is a side view of the connector of FIG. 1 in a partially assembled state with a ferrule and hub of the connector pushed towards a rear of the connector.
Figure 7:
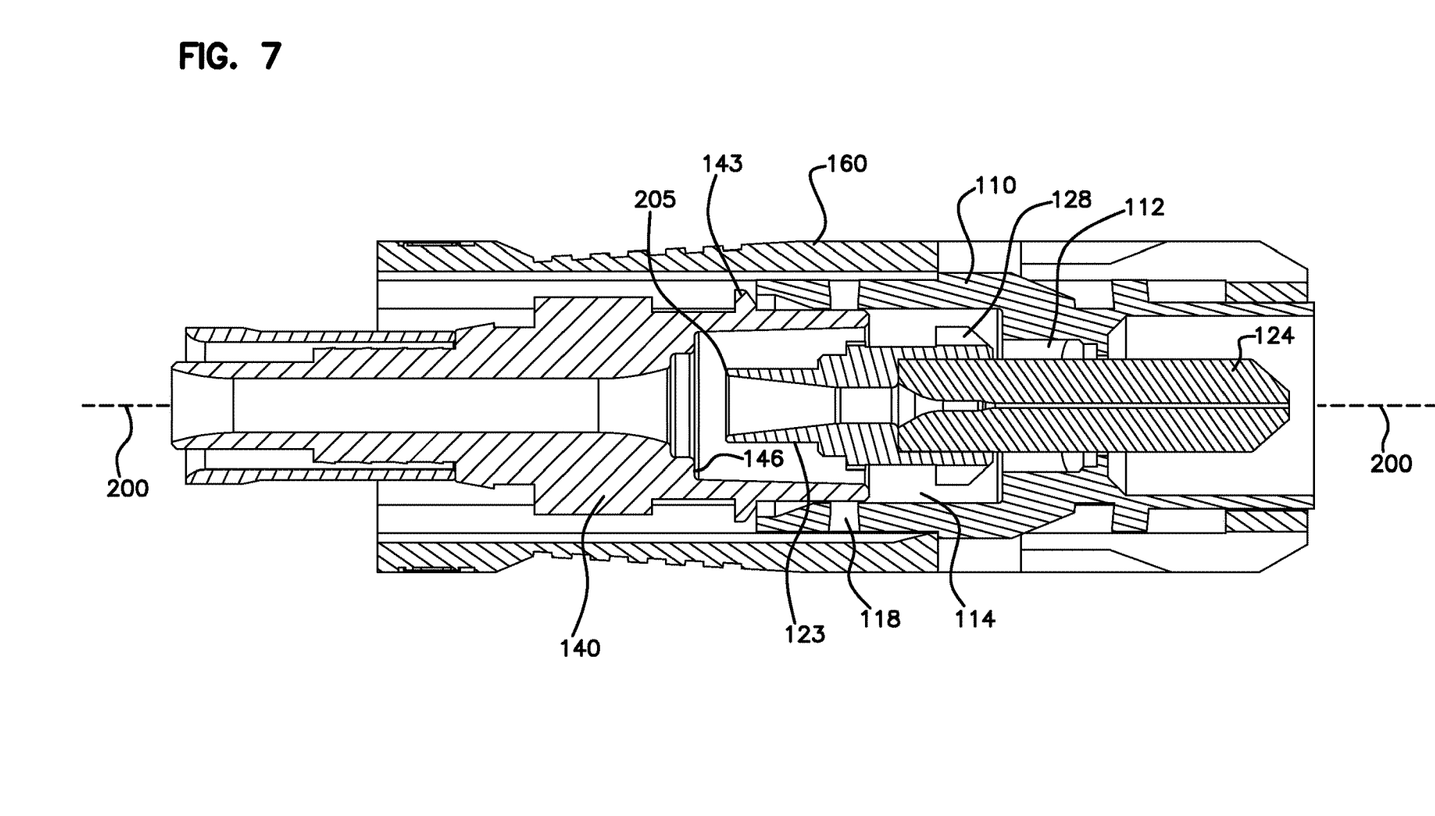
FIG. 7 is a cross-sectional view the connector shown in FIG. 6.

Referring now to FIGS. 6 and 7, with the front housing 110 and rear housing 140 in the same relative position as in FIGS. 4 and 5, the ferrule 124 and the hub 122 can be pushed back against the biasing force of the spring 130 along the longitudinal axis 200 towards the rear housing 140 so that the anti-rotation portion 128 of the hub 122 enters the cavity 114 and completely clears the anti-rotation seat 112. There is sufficient distance between the anti-rotation seat 112 and the surface 146 so that a rear end 205 of the elongated cylindrical rear portion 123 of the hub 122 remains spaced apart from the surface 146 of the rear housing 140. In this position, because the anti-rotation portion 128 of the hub 122 is no longer engaged in the anti-rotation seat 112 of the front housing 110, the ferrule 124 and the hub 122 can be rotated about the longitudinal axis 200 to tune the connector 100 as desired.

Tuning can be by any method useful to determine the desired rotational position of the ferrule 124 in the connector 100. Once the ferrule 124 has been rotated to the desired rotational alignment, the ferrule 124 can be released and the spring 130 can once again bias the anti-rotation portion 128 of the hub 122 into the anti-rotation seat 112 of the front housing 110 (similar to the configuration illustrated in FIGS. 4 and 5), thereby preventing further rotation.

To complete assembly of the connector 100, the portion 201 of the rear housing 140 is slid into the front housing 110 so that the tabs 143 enter the openings 118 to fully couple the rear housing 140 to the front housing 110. This is the configuration previously described in reference to FIGS. 2 and 3.

In the completely assembled configuration, as shown in FIGS. 2 and 3, the longitudinal distance along the longitudinal axis 200 between the anti-rotation seat 112 and the surface 146 of the rear housing 140 is shortened. In this state, it is no longer possible to push the ferrule 124 and the hub 122 along the longitudinal axis 200 back into the cavity 114 far enough to allow the anti-rotation portion 128 of the hub 122 to completely clear the anti-rotation seat 112 of the front housing 110. This is illustrated in the completely assembled connector 100 of FIGS. 8 and 9, wherein the ferrule 124 and the hub 122 are pushed back into the cavity 114 until the rear end 205 of the elongated cylindrical rear portion 123 of the hub 122 bottoms out against the surface 146 of the rear housing 140.

Figure 8:
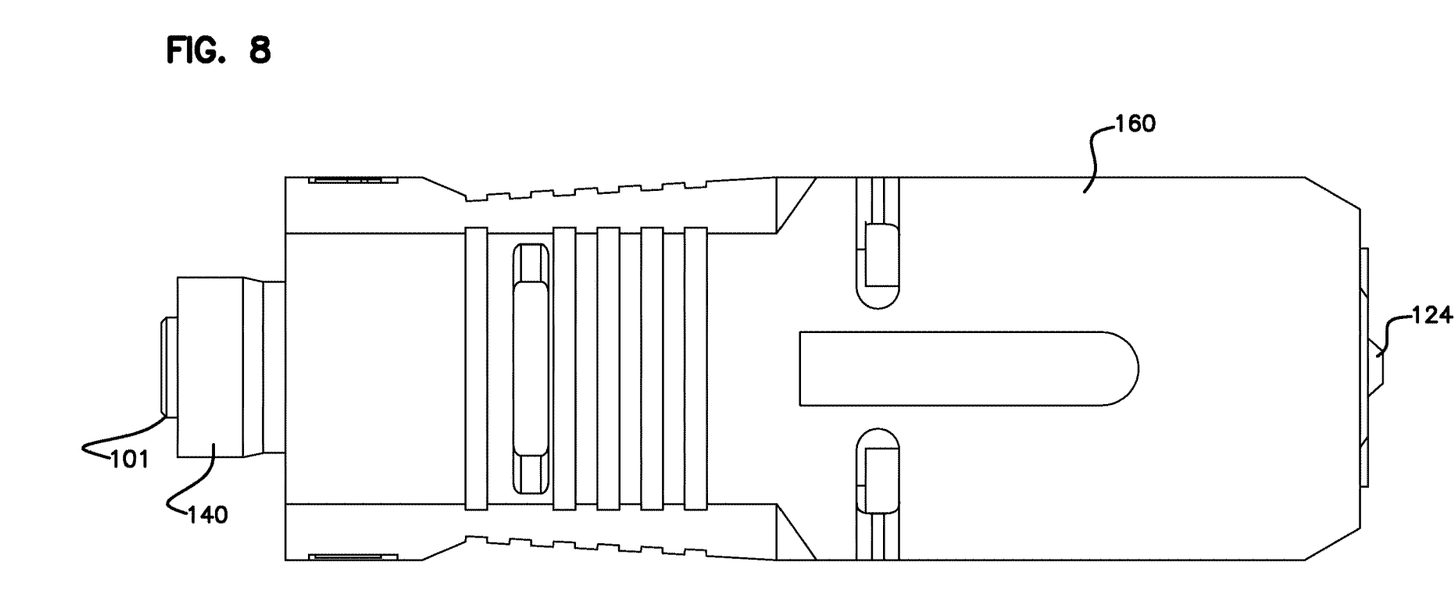
FIG. 8 is a side view of the connector of FIG. 1 in a fully assembled state with the ferrule and hub pushed back towards a rear of the connector.
Figure 9:
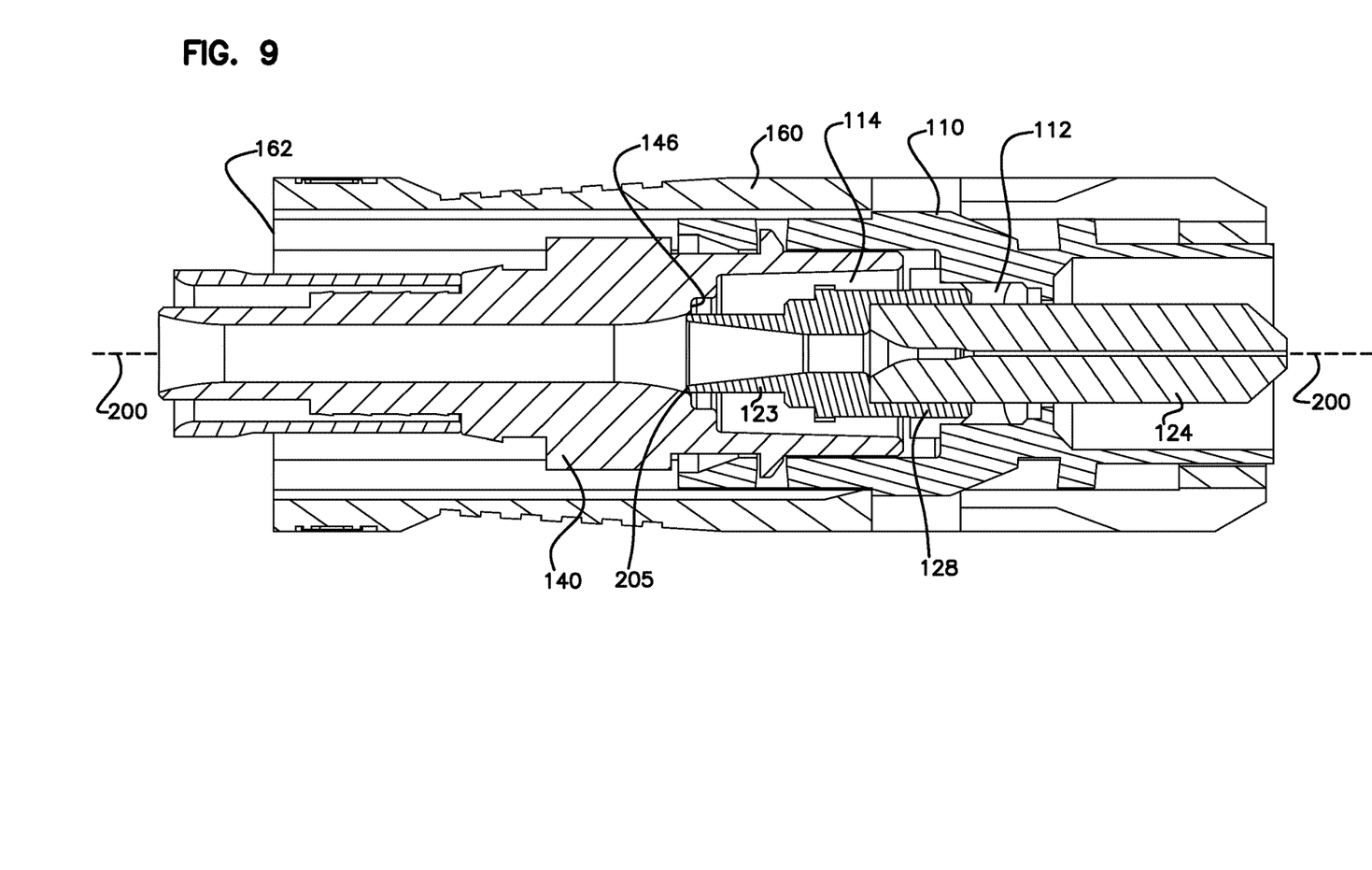
FIG. 9 is a cross-sectional view of the connector shown in FIG. 8.
Figure 10:
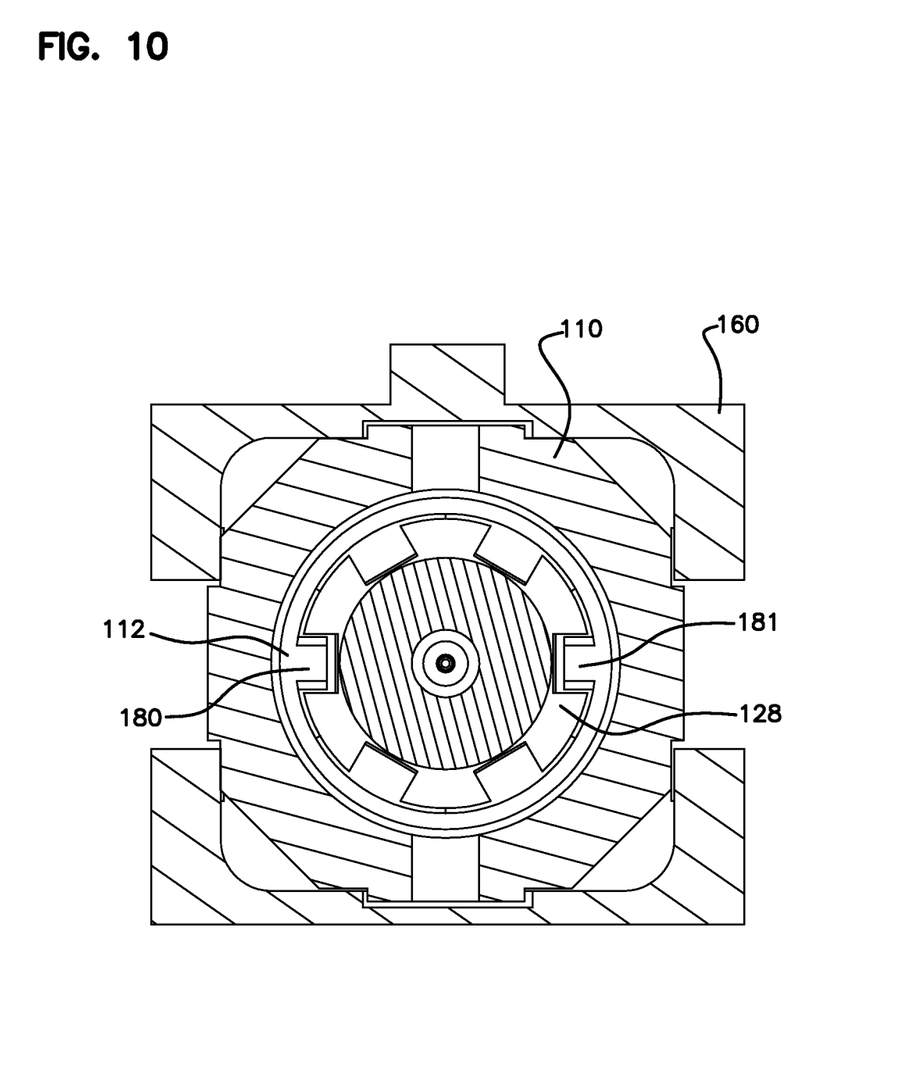
FIG. 10 is a cross-sectional view of the connector shown in FIG. 3.
Figure 11:
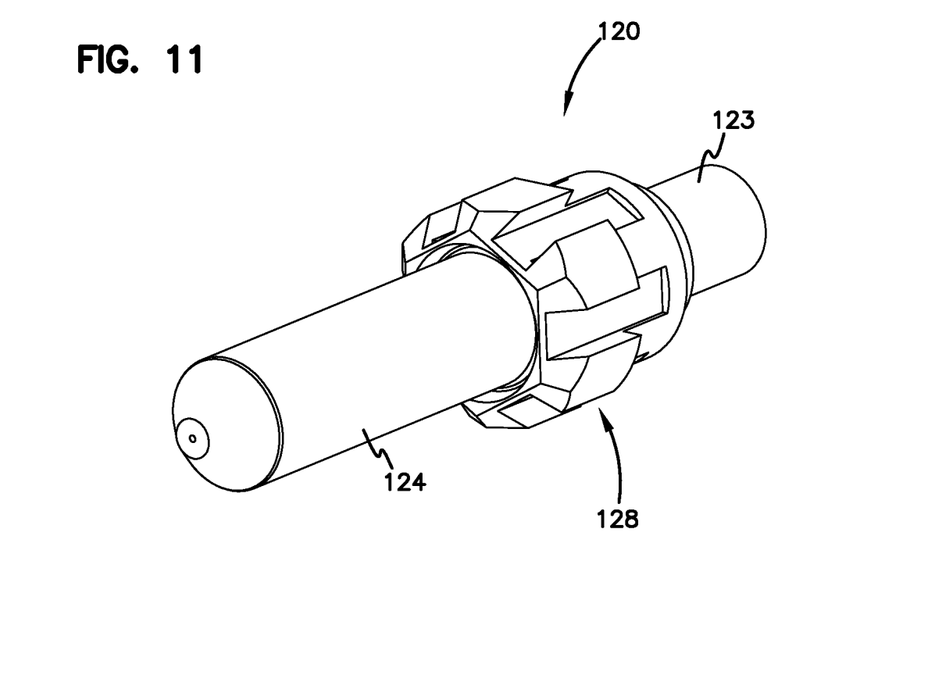
FIG. 11 is a perspective view of the hub/ferrule assembly of the connector shown in FIG. 1.
Figure 12:
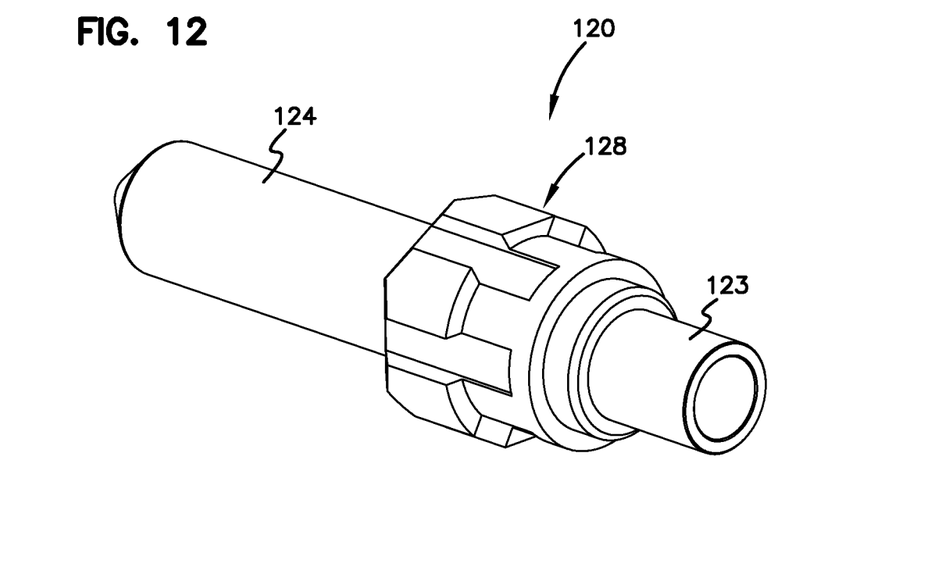
FIG. 12 is another perspective view of the hub/ferrule assembly of the connector shown in FIG. 1.

The hub 122 and the ferrule 124 cannot travel any farther back along the longitudinal axis 200 once the rear end 205 engages the surface 146. In this position, the anti-rotation portion 128 of the hub 122 cannot completely clear the anti-rotation seat 112 of the front housing 110, thereby preventing rotation of the hub 122 and ferrule 124 about the longitudinal axis 200.

Therefore, in the fully assembled configuration of the connector 100 shown in FIGS. 8 and 9, neither a pushing force applied to the ferrule 124 nor a pulling force applied to the cable attached to the connector 100 and translated through the optical fiber to the ferrule 124 can cause the anti-rotation portion 128 to completely clear the anti-rotation seat 112. This prevents rotation of the ferrule 124, thereby assuring that a fully assembled connector 100 will not become un-tuned. Additional details regarding such a tuning method can be found in U.S. Pat. No. 6,629,782 filed on Feb. 4, 2002, the entirety of which is hereby incorporated by reference.

Figure 13:
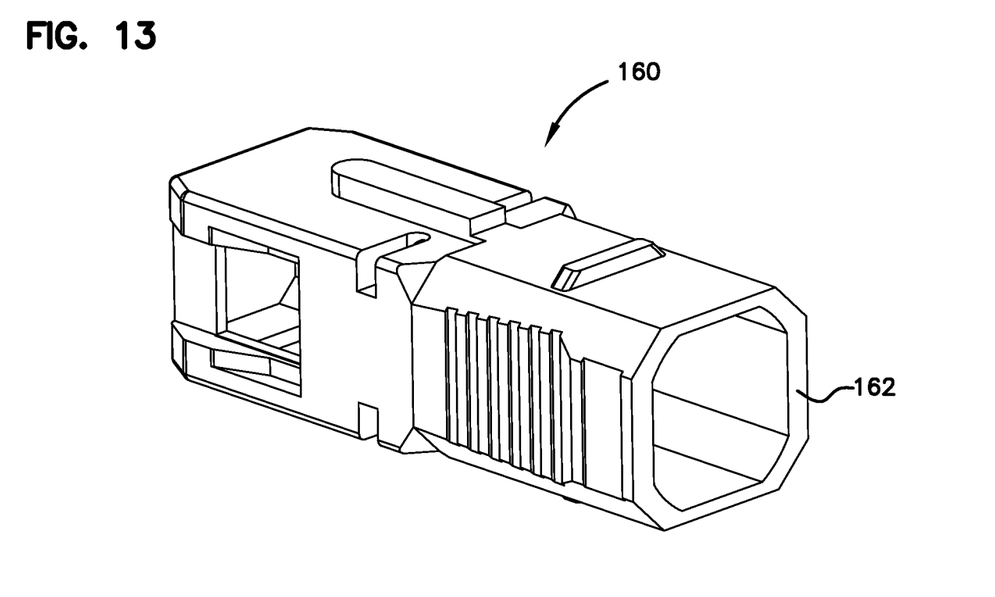
FIG. 13 is a perspective view of the key member of the connector shown in FIG. 1.
Figure 14:
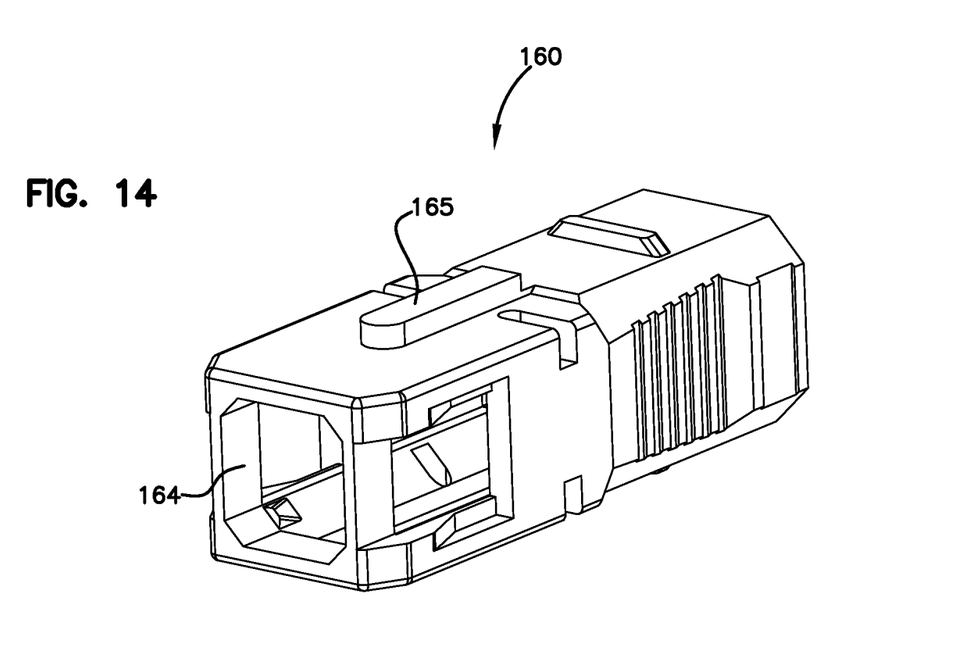
FIG. 14 is another perspective view of the key member of the connector shown in FIG. 1.

As shown in FIGS. 13-14, the key member 160 is placed onto the front housing 110 at the desired orientation to key the connector 100 according to the tuned position. Specifically, the key member 160 includes a rear opening 162 configured to receive the front housing 110 in one of four orientations. The key member 160 is oriented so that a key protrusion 165 on the outer surface of the key member 160 corresponds to the tuned position of the connector 100, and then the key member 160 is slid onto the front housing 110 so that the front housing 110 is positioned within the rear opening 162. For example, the key protrusion 165 is positioned to correspond to the tuned orientation of the hub/ferrule assembly 120.

Once inserted, the front housing 110 is coupled to the key member 160. The ferrule 124 extends through a front opening 164 of the key member 160 for mating with another connector. In this configuration, the key protrusion 165 marks the tuned orientation of the connector 100. Additional details regarding the key member 160 can be found in U.S. Pat. No. 5,212,752 filed on May 27, 1992, the entirety of which is hereby incorporated by reference.

Figure 15:
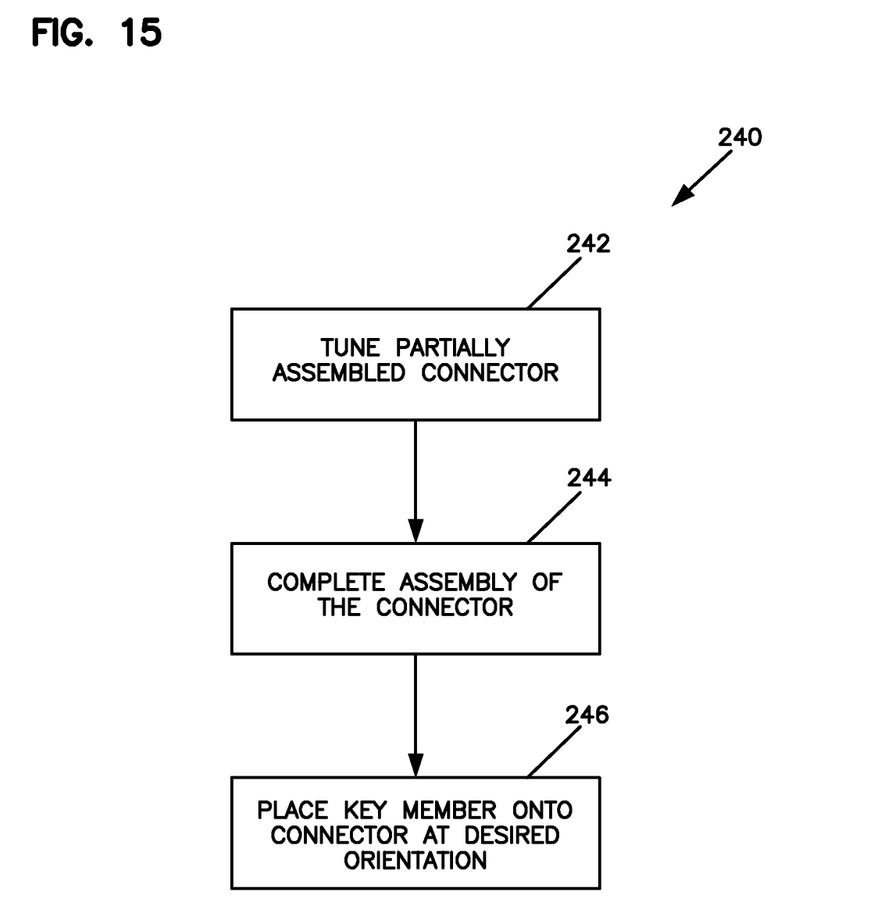
FIG. 15 shows a method for tuning a connector in a partially assembled state.

As described above, this first process can be used to tune the connector 100 during assembly. For example, referring to FIG. 15, a first process 240 for tuning the connector 100 in the partially assembled state is shown. Initially, at operation 242, the connector 100 is tuned in the partially assembled state as described herein. Next, at operation 244, assembly of the connector 100 is completed. Finally, at operation 246, the key member is placed on the connector at the desired orientation.

Figure 16:
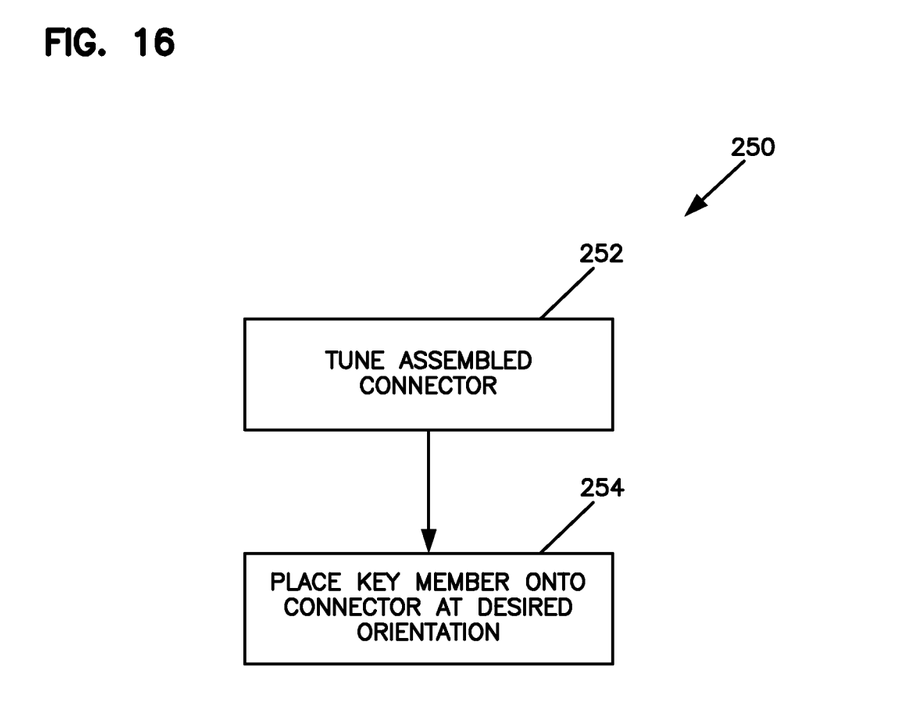
FIG. 16 shows a method for tuning a connector in an assembled state.

In a second process 250 shown in FIG. 16, the connector 100 can be tuned after assembly. Specifically, the second process 250 is performed after the connector 100 is assembled. Initially, at operation 252, the assembled connector 100 is tuned using one or more known methods for tuning. For example, the connector 100 can be tuned so that a preferred orientation from one of four for the front housing 110 is identified. Next, at operation 254, the key member 160 is attached to the connector 100 at the desired orientation.

Figure 17:
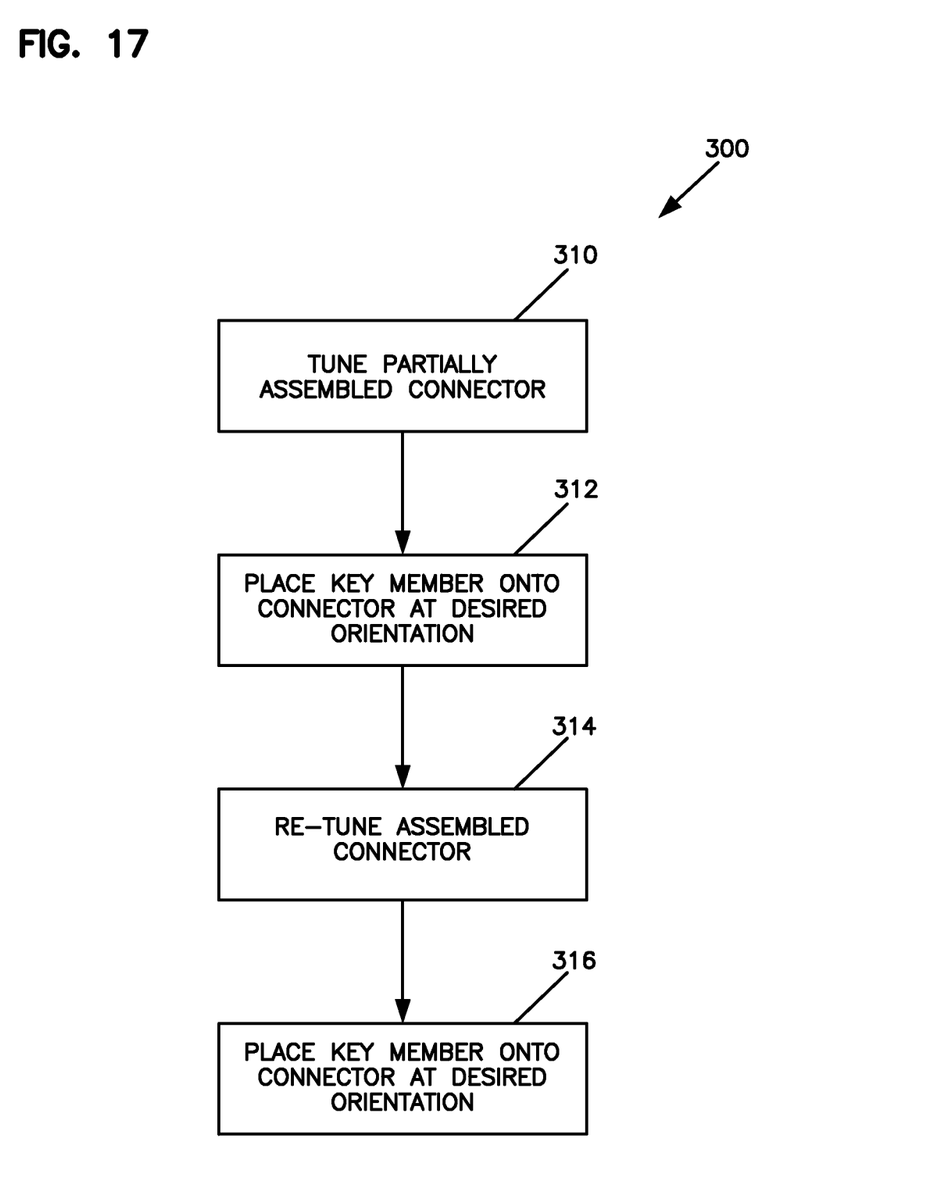
FIG. 17 shows a method for tuning a connector in partially assembled and assembled states.

Referring now to FIG. 17, another method 300 for tuning is described. In this method 300, the first and second processes are combined so that the connector can be tuned using either and/or both processes.

Initially, at operation 310, the connector 100 is tuned during assembly of the connector 100. For example, the connector 100 can be tuned using the first process described herein. Next, at operation 312, the connector 100 can be keyed by placement of the key member onto the connector.

Next, at operation 314, the assembled connector 100 can be tuned using the second process. This can be done for a variety of reasons. For example, as noted below, the connector 100 could have been improperly tuned (e.g., which could be identified during testing of connector performance), or the connector could become detuned through use (e.g., if the hub/ferrule assembly 120 is force back hard enough to clear the anti-rotation seat 112 and spun, detuning can occur). Finally, at operation 316, the key member is placed at the desired orientation.

Operations 310, 312 and 314, 316 can be performed separately on selected connectors, or performed sequentially. For example, as noted below, tuning of the connector is flexible, allowing the connector to be tuned by either of the first or second processes. In addition, the connector can be tuned using both processes, if desired.

There are several advantages for a connector that can be tuned using a variety of methods. Tuning has the potential to enhance the performance of the connector. Allowing multiple methods for tuning provides greater flexibility during manufacture of the connector. For example, some connectors can be tuned during manufacture, and other connectors can be tuned after manufacture.

Further, the multiple methods allow for re-tuning of connectors as desired. For example, a connector can be tuned during manufacture using the first process. At a later point, the connector can be re-tuned (e.g., if the connector was not properly tuned during manufacture or becomes untuned during use) using the second process. Other advantages may be realized.

The connector can be tuned using a variety of methods. For example, the connector can be tuned manually by an individual and keyed. In such a process, the individual can test the connector at a variety of orientations and select a desired orientation for keying. In another example, the connector can be tuned using an automated process that selects the desired orientation and keys the connector. Other processes, such as a hybrid approach using both automated and manual tuning methods, can be used.

Although the examples shown herein illustrate an SC connector, other connector types can be used. For example, in alternative embodiments, an LC or LX.5 connector can be used, such as that illustrated in U.S. Pat. No. 6,629,782.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of tuning a fiber optic connector, the method comprising:
    assembling the fiber optic connector to a partially assembled state in which a first portion of a housing of the fiber optic connector is partially inserted into a second portion of the housing of the fiber optic connector;
    tuning the fiber optic connector in the partially assembled state using a first tuning process;
    assembling the fiber optic connector to a fully assembled state in which the first portion is fully inserted into the second portion so that the first tuning process is prevented; and
    tuning the fiber optic connector in the fully assembled state using a second tuning process.

2. The method of claim 1, further comprising rotating a ferrule to tune the fiber optic connector.

3. The method of claim 2, further comprising attaching a key member to tune the fiber optic connector.

4. The method of claim 1, further comprising:
    rotating a ferrule to tune the fiber optic connector in the partially assembled state; and
    attaching a key member to tune the fiber optic connector in the fully assembled state.

* * * * *